US008413221B2

(12) United States Patent
Kaliski, Jr. et al.

(10) Patent No.: US 8,413,221 B2
(45) Date of Patent: Apr. 2, 2013

(54) METHODS AND APPARATUS FOR DELEGATED AUTHENTICATION

(75) Inventors: Burton S. Kaliski, Jr., Wellesley, MA (US); Magnus Nyström, Vallentuna (SE)

(73) Assignee: EMC Corporation, Hopkinton, MA (US)

( * ) Notice: Subject to any disclaimer, the term of this patent is extended or adjusted under 35 U.S.C. 154(b) by 1470 days.

(21) Appl. No.: 11/930,738

(22) Filed: Oct. 31, 2007

(65) Prior Publication Data

US 2008/0313719 A1     Dec. 18, 2008

Related U.S. Application Data

(60) Provisional application No. 60/896,686, filed on Mar. 23, 2007.

(51) Int. Cl.
*H04L 9/32* (2006.01)

(52) U.S. Cl. .......................................... 726/5

(58) Field of Classification Search ................ 726/5
See application file for complete search history.

(56) References Cited

U.S. PATENT DOCUMENTS

| 6,985,583 B1* | 1/2006 | Brainard et al. ............... 380/44 |
| 7,086,085 B1* | 8/2006 | Brown et al. ...................... 726/7 |
| 2003/0145223 A1* | 7/2003 | Brickell et al. ............... 713/201 |
| 2005/0021964 A1* | 1/2005 | Bhatnagar et al. ............. 713/175 |
| 2005/0166263 A1 | 7/2005 | Nanopoulos et al. |
| 2006/0174122 A1* | 8/2006 | Falch et al. .................... 713/175 |
| 2007/0113294 A1* | 5/2007 | Field et al. ....................... 726/27 |
| 2008/0034216 A1* | 2/2008 | Law .............................. 713/183 |

OTHER PUBLICATIONS

M. Nyström, "The EAP Protected One-Time Password Protocol (EAP-POTP)," IETF RFC 4793, Feb. 2007, pp. 1-77.
G. Richards, "OTP Kerberos," Jun. 25, 2007, pp. 1-16.
J. Linn et al., "OTP Methods for TLS," Jun. 5, 2006, pp. 1-14.
RSA Laboratories, "One-Time Password Validation Service," Version 1.0, Apr. 26, 2006, pp. 1-40.
RSA Laboratories,"Password-Based Cryptography Standard," PKCS #5, Version 2.0, Mar. 25, 1999, pp. 1-30.
OASIS, "Assertions and Protocols for the OASIS Security Assertion Markup Language (SAML)," Version 2.0, OASIS Standard, Mar. 15, 2005, pp. 1-86.

* cited by examiner

*Primary Examiner* — Kambiz Zand
*Assistant Examiner* — Aubrey Wyszynski
(74) *Attorney, Agent, or Firm* — Ryan, Mason & Lewis, LLP

(57) ABSTRACT

An authentication-delegating service implemented in an authentication server or other processing device is configured to receive a request from a relying party for delegated authentication information associated with a particular user, to determine a level of trust associated with the relying party, and to provide the delegated authentication information to the relying party if the relying party has a sufficient level of trust, so as to permit the relying party to authenticate the user based on the delegated authentication information. The delegated authentication information has the property that the user can be presently authenticated based on such information. The delegated authentication information may comprise, for example, at least one value derived from a one-time password or other authentication credential of the particular user. The authentication-delegating service may be graded to provide different types of delegated authentication information based on respective levels of trust that may be associated with relying parties.

22 Claims, 4 Drawing Sheets

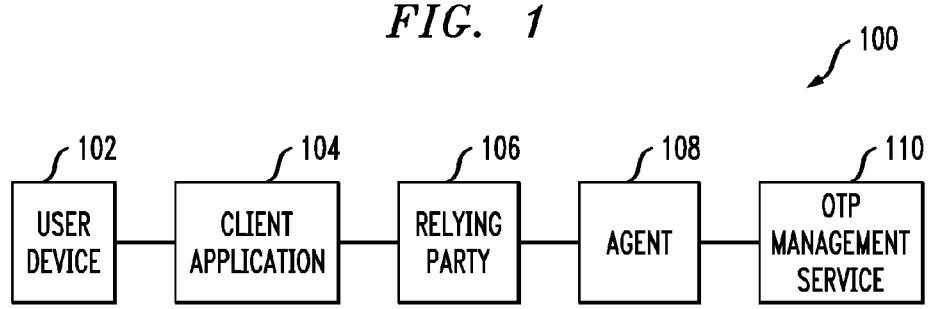
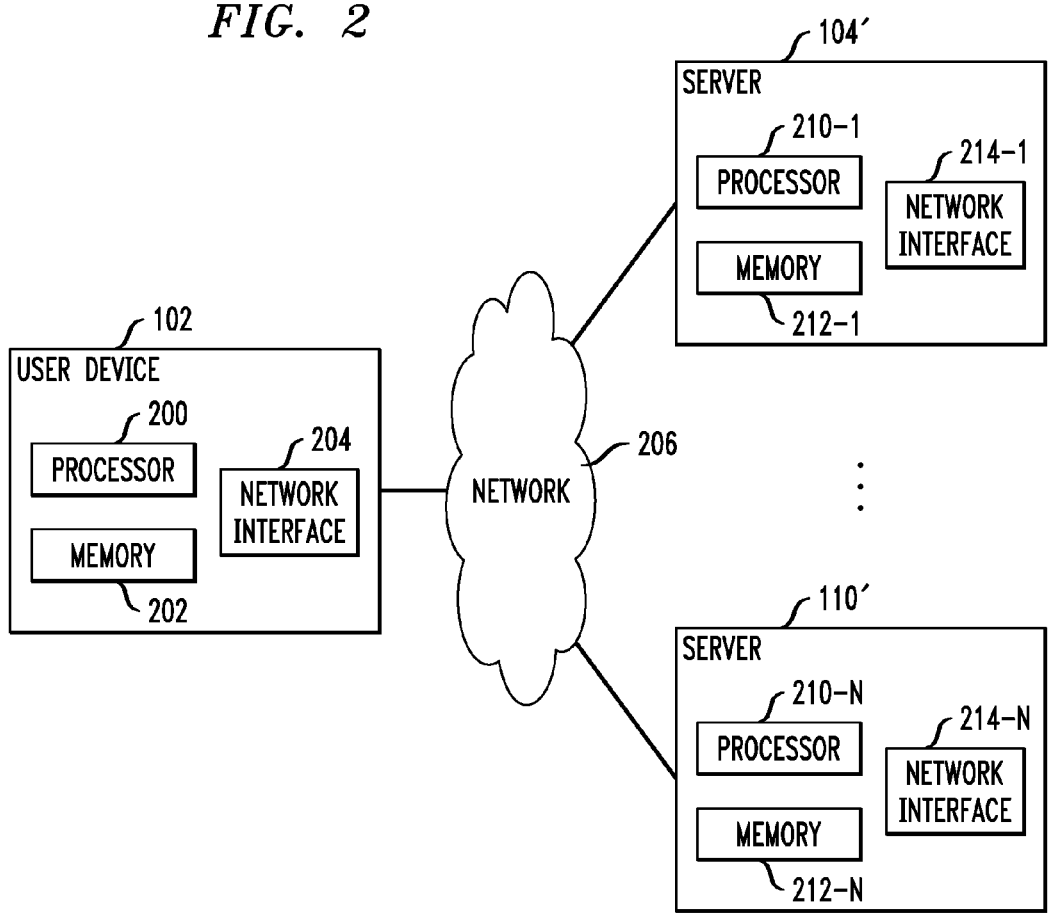

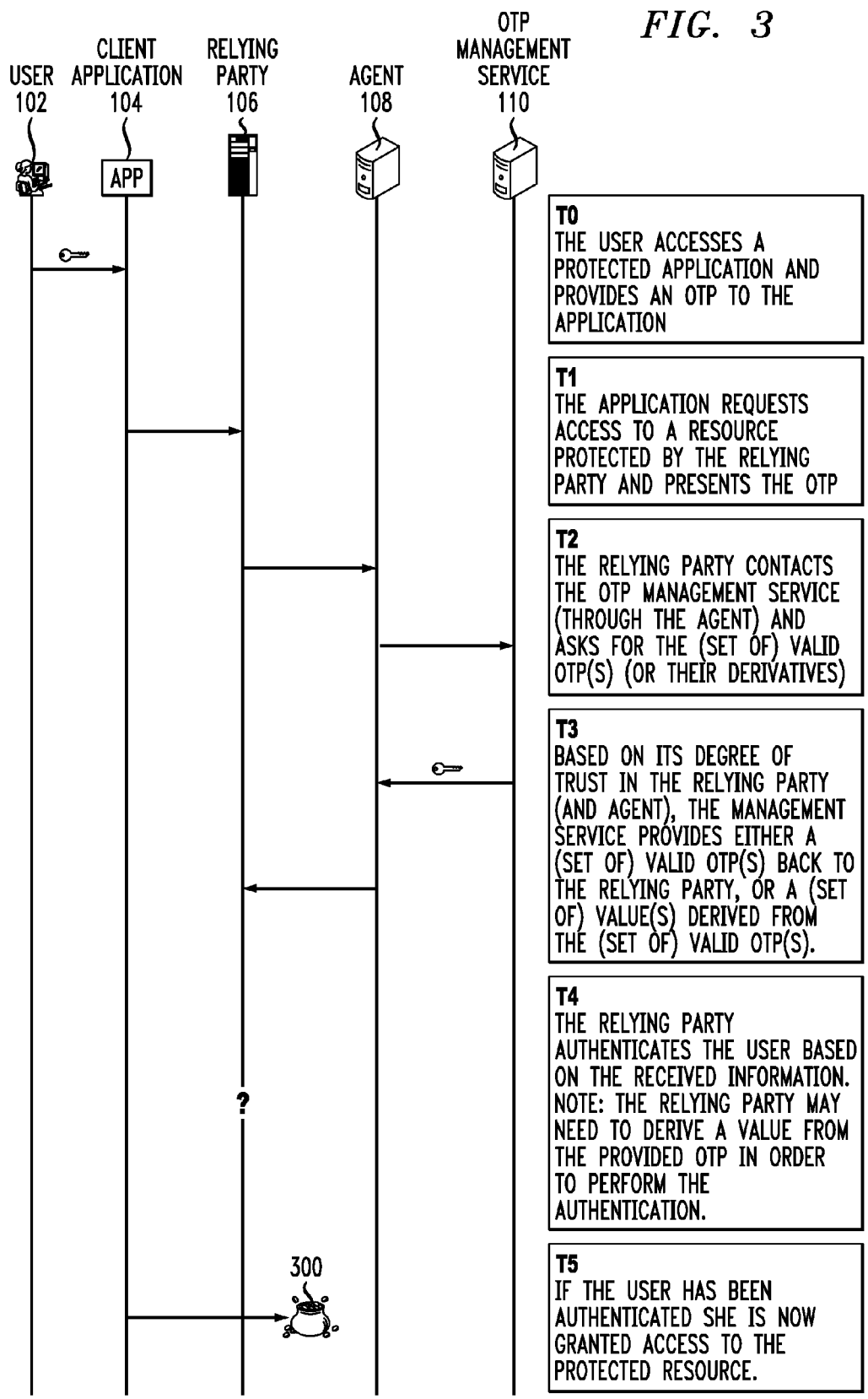

METHODS AND APPARATUS FOR DELEGATED AUTHENTICATION

RELATED APPLICATION(S)

The present application claims the priority of U.S. Provisional Patent Application Ser. No. 60/896,686, filed Mar. 23, 2007 and entitled "Delegated Validation: Beyond Yes/No Responses," the disclosure of which is incorporated by reference herein.

FIELD OF THE INVENTION

The present invention relates generally to cryptographic techniques for authenticating users over a network or in other types of communication systems.

BACKGROUND OF THE INVENTION

Conventional user authentication techniques typically involve users authenticating to applications before being granted access to protected resources. Such authentication is based on user submission of a password or other authentication credential. For administrative reasons, the authenticating applications oftentimes communicate with a central authentication service maintaining credentials for multiple authorized users.

Passwords or other credentials submitted for user authentication may comprise one-time passwords (OTPs) generated by authentication tokens. Authentication tokens may be implemented as small, hand-held devices that display a series of passwords over time. A user equipped with such an authentication token reads the currently displayed password and enters it into a computer or other element of an authentication system as part of an authentication operation. This type of dynamic password arrangement offers a significant security improvement over authentication based on a static password.

Known authentication tokens include, for example, time-based tokens and event-based tokens. In a typical time-based token, the displayed passwords are based on a secret value and the time of day. A verifier with access to the secret value and a time of day clock can verify that a given presented password is valid. In a typical event-based token, the displayed passwords are based on a secret value and an event counter. The event counter may count the number of occurrences of a particular event, such as a user pressing a button on the token. A verifier with access to the secret value and the current event count can verify that a given presented password is valid. Other types of authentication tokens include challenge-response tokens, and hybrid tokens that incorporate various combinations of time-based, event-based and challenge-response techniques.

An example of a conventional authentication token is the RSA SecurID® authentication token, commercially available from RSA, The Security Division of EMC Corporation, of Bedford, Mass., U.S.A.

Passwords can be communicated directly from the authentication token to a computer or other element of an authentication system, instead of being displayed to the user. For example, a wired connection such as a universal serial bus (USB) interface may be used for this purpose. Wireless authentication tokens are also known. In such tokens, the passwords are wirelessly communicated to a computer or other element of an authentication system. Tokens having these wired or wireless communication arrangements are referred to as connected tokens, and save the user the trouble of reading the password from the display and manually entering it into the computer as in a disconnected token.

A number of different communication protocols have been developed recently for use by applications handling OTPs. One such protocol is described in M. Nyström, "The Protected One-Time Password Protocol (EAP-POTP)," IETF RFC 4793, February 2007, which is incorporated by reference herein. In protocols of this type, rather than communicating directly with a central authentication service, an application typically communicates with a relying party who, in turn, communicates with the central authentication service. The application receives an OTP from a user and sends information derived from the OTP to the relying party, rather than sending the OTP itself to the relying party. This can create problems in that the central authentication service may only be configured to validate OTPs and may not have any knowledge of protocol-specific OTP transforms.

Under conventional practice, in order to allow the central authentication service to validate OTP-derivative information submitted to it by the relying party, the service must be modified to be made aware of the details of the particular protocol used to generate that information. Moreover, the number of protocols to be supported and their associated details can change frequently. The resulting requirement for continuous incorporation of protocol-specific knowledge into the central authentication service substantially increases the cost and complexity associated with providing the service. It can also complicate the situation for relying parties as they may be forced to continuously update their interfaces to the authentication service.

SUMMARY OF THE INVENTION

The present invention in an illustrative embodiment provides an improved approach to user authentication which can allow an otherwise conventional central authentication service to support validation of OTP-derivative information generated by a wide variety of application protocols, without requiring that the service be made aware of the particular details of those protocols.

In accordance with one aspect of the invention, an authentication-delegating service implemented in an authentication server or other processing device is configured to receive a request from a relying party for delegated authentication information associated with a particular user, to determine a level of trust associated with the relying party, and to provide the delegated authentication information to the relying party if the relying party has a sufficient level of trust, so as to permit the relying party to authenticate the user based on the delegated authentication information.

The delegated authentication information has the property that the user can be presently authenticated based on such information. The delegated authentication information may comprise at least one value derived from an OTP or other authentication credential of the particular user. For example, the value may comprise a protected one-time password (POTP) derived from an OTP of the particular user, or a doubly protected one-time password (PPOTP) derived from a POTP of the particular user. The relying party may not be in possession of the OTP or other authentication credential of the user, but the delegated authentication information permits the relying party to authenticate information derived from the OTP or other authentication credential of the user. The OTP-derivative information authenticated by the relying party using the delegated authentication information may comprise, for example, a message authentication code (MAC)

generated based on the OTP and other information, or an encryption performed utilizing at least a function of the authentication credential.

In accordance with another aspect of the invention, the authentication-delegating service may be graded to provide different types of delegated authentication information based on respective levels of trust that may be associated with relying parties. Thus, the authentication-delegating service may determine which of a plurality of trust levels is associated with the relying party, the plurality of trust levels corresponding to respective ones of a plurality of different types of delegated authentication information, and provide delegated authentication information of a particular one of the plurality of different types to the relying party based on the particular one of the plurality of trust levels that is determined to be associated with the relying party.

The delegated authentication techniques of the illustrative embodiments overcome one or more of the problems associated with the conventional techniques described previously. For example, the delegated authentication techniques allow relying parties to utilize an OTP management service running on an authentication server to obtain delegated authentication information that may be used to authenticate users even though the relying party does not have possession of the corresponding OTPs. This is accomplished without requiring that the central authentication service be made aware of the particular details used to generate the OTP-derivative information held by the relying party. In addition, it makes it easier for relying parties to maintain their interfaces to the authentication service. These and other features and advantages of the present invention will become more readily apparent from the accompanying drawings and the following detailed description.

BRIEF DESCRIPTION OF THE DRAWINGS

FIG. 1 is a block diagram of an authentication system with delegated validation in an illustrative embodiment of the invention.

FIG. 2 shows one possible arrangement of processing devices implementing the FIG. 1 system.

FIG. 3 is a diagram showing a delegated validation process in an illustrative embodiment of the invention.

DETAILED DESCRIPTION

Figure 4:
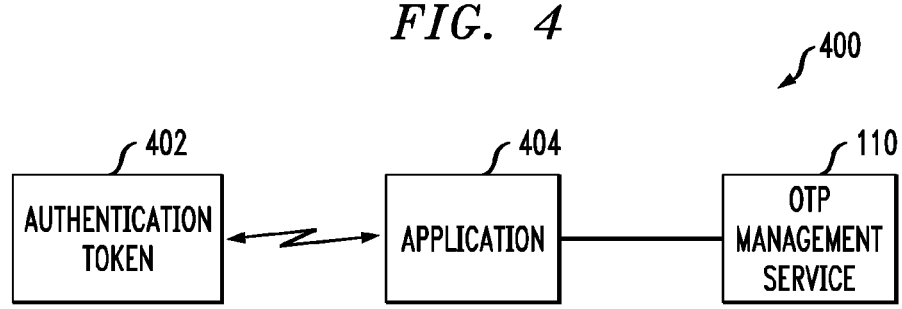
FIG. 4 is a block diagram of an alternative authentication system configuration in another illustrative embodiment of the invention.

The present invention will be described herein with reference to exemplary authentication systems that implement delegated authentication techniques. It is to be appreciated, however, that the invention is not restricted to use in these or any other particular system configurations.

Additional details regarding certain conventional cryptographic techniques referred to herein may be found in, e.g., A. J. Menezes et al., Handbook of Applied Cryptography, CRC Press, 1997, which is incorporated by reference herein.

The term "authentication information" as used herein is intended to include passwords, passcodes, answers to life questions, or other authentication credentials, or values derived from such authentication credentials, or more generally any other information that a user may be required to submit in order to obtain access to a protected resource.

Although the illustrative embodiments will be described below in the context of passwords, and more particularly OTPs, it is to be appreciated that the invention is more broadly applicable to any other type of authentication information.

FIG. 1 shows an authentication system 100 which will be used to illustrate the delegated validation techniques of the invention. The system 100 in this embodiment includes a user device 102, an application 104, a relying party 106, an agent 108 and an OTP management service 110.

The user device 102 may be an authentication token, a mobile telephone, a desktop or portable computer, a personal digital assistant (PDA), a wireless email device, a game console, a set top box or any other processing device utilizable for submission of authentication information for validation in an authentication system.

The user device 102 may also be referred to herein as simply a "user." The term "user" should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device. Similarly, a password or other authentication information described as being associated with a user may, for example, be associated with a user device, a person utilizing or otherwise associated with the device, or a combination of both the person and the device.

It will be assumed that the user is equipped with an authentication token capable of generating OTPs based on a secret (e.g., a seed) shared between the token and the OTP management service 110. Such a token may be a hand-held hardware token separate from the user device 102, or may be incorporated into the user device 102, for example, as a hardware or software authentication token. Thus, the user device 102 may itself comprise a hardware or software authentication token.

The application 104 is also referred to herein as a client or a client application. The application communicates with the relying party 106 on behalf of the user device 102.

The relying party 106 operates in conjunction with the agent 108 and OTP management service 110 to support delegated authentication. The relying party may itself be an application that needs to authenticate a user and relies on credentials provided by the application 104 and services provided by the OTP management service through the agent to do so.

The agent 108 serves as a conduit for the relying party 106 and possibly one or more other relying parties that wish to contact the OTP management service 110. The agent may be viewed as a client of the OTP management service.

The OTP management service 110 processes requests made by the relying party for delegated authentication information. The delegated authentication information in this embodiment has the property that the user can be presently authenticated based on such information. The delegated authentication information may comprise, for example, one or more OTP values, or values derived from OTPs. The OTP management service may be implemented at least in part in the form of software running on an otherwise conventional authentication server or other processing device. The OTP management service is an example of what is more generally referred to herein as an authentication-delegating service.

It is to be appreciated that a given embodiment of the system 100 may include multiple instances of user device 102, application 104, relying party 106, agent 108 and OTP management service 110, although only single instances of such components are shown in the system diagram of FIG. 1 for clarity of illustration. Also, alternative embodiments may eliminate one or more elements of the FIG. 1 system, or combine various elements together. For example, the agent may be eliminated or combined with the relying party or the OTP management service in alternative embodiments. Another embodiment may combine the application and the relying party. That is, the relying party may be the application itself Numerous other system configurations may be used.

Interactions between the various elements of the FIG. 1 system may occur over one or more networks, or using other types of communication media.

FIG. 2 shows one possible arrangement of processing devices for implementing the FIG. 1 system. In this example, the user device 102 is implemented as a computer or other processing device comprising a processor 200, a memory 202 and a network interface 204. The user device 102 communicates over a network 206 with a server 104' running application 104. The server 104' is one of N servers, each having a processor 210-$i$, a memory 212-$i$ and a network interface 214-$i$, where i=1, 2, ... N.

The processors 200 and 210 may comprise, for example, conventional microprocessors, application-specific integrated circuits (ASICs) or other types of processing circuitry, in any combination. The memories 202 and 212 may comprise, for example, random access memory (RAM), read-only memory (ROM), magnetic memory, optical memory, or other types of memory, in any combination.

The network 206 may comprise, for example, a global computer network such as the Internet, a wide area network (WAN), a local area network (LAN), a satellite network, a telephone or cable network, or various portions or combinations of these and other types of networks.

A delegated validation process in accordance with the present invention may be embodied in software stored and executed by memory and processor elements of the processing devices shown in FIG. 2. For example, the application 104 may comprise software stored in memory 212-1 and executed by processor 210-1 of server 104'. Such software may be configured, again by way of example, to provide one or more web pages to the user device 102 via the network 206.

Another one of the N servers in FIG. 2 is a server 110' which implements the OTP management server 110. Other ones of the N servers not explicitly shown may be associated with respective elements 106 and 108 of the FIG. 1 system. Although such an arrangement assumes a single server associated with each of the system elements 104, 106, 108 and 110, numerous other arrangements are possible. For example, one or more of the elements may each be implemented using multiple servers, or two or more of the elements may be implemented by a single server. Also, processing devices other than servers may be used, but such devices may be generally characterized as comprising at least processor and memory elements of the type described above. Such processing devices are also referred to herein as hosts.

In operation, the system 100 allows validation decisions or other types of authentication decisions to be delegated from the OTP management service 110 to the relying party 106. The OTP management service may comprise an otherwise conventional central authentication service of the type described elsewhere herein, suitably modified to support delegated authentication. A central authentication service typically comprises one or more authentication servers configured with appropriate authentication software. An example of known authentication software utilizable in authenticating OTPs generated by an RSA SecurID® authentication token is described in RSA Laboratories, "One-Time Password Validation Service," Version 1.0, April 2006, which is incorporated by reference herein.

With reference now to FIG. 3, an illustrative embodiment of a delegated authentication process is shown. It is assumed that this process is implemented in the system 100 of FIG. 1, utilizing interaction between system elements 102, 104, 106, 108 and 110 as shown. The authentication information provided by the user comprises an OTP.

Operations associated with particular points in time denoted T0 through T5 are shown.

At time T0, the user equipped with user device 102 attempts to access a protected application 104, which is more specifically denoted as a client application for purposes of this example.

At time T1, the application 104 requests access to a resource 300 protected by the relying party 106 and presents the OTP provided by the user. Alternatively, the application may present the relying party with information derived from the OTP, rather than the OTP itself.

At time T2, the relying party 106 contacts the OTP management service 110 via the agent 108 and requests delegated authentication information associated with the user that provided the OTP. The delegated authentication information may comprise, for example, a single valid OTP, a set of valid OTPs, or one or more values derived from the single OTP or set of OTPs.

At time T3, the OTP management service 110 determines a level of trust associated with the relying party 106. This determination in the present embodiment may also encompass the agent 108. The term "level of trust" as used herein is intended to be construed broadly, so as to encompass, for example, various fixed levels of trust, such as first, second and third levels in a graded arrangement, as well as other arrangements for ascertaining the degree of trust that may be placed in a particular relying party and its associated agent. Based on its degree of trust in the relying party and agent, the OTP management service provides one or more OTPs, or one or more values derived from the one or more OTPs, back to the relying party. The OTP management service may alternatively refuse the request if, for example, the relying party is not authorized to make such a request.

This is an example of what is more generally referred to herein as graded delegated authentication, in that there are different levels of trust that may be associated with various relying parties, and the type of delegated authentication information provided to a particular relying party is based on the particular level of trust associated with that party. Thus, if a high level of trust is associated with the relying party, the relying party is provided with one or more OTPs, while if a lower level of trust is associated with the relying party, the relying party is not provided with the actual OTPs, but is instead provided with one or more values derived from the OTPs. This is a type of two-level graded delegated authentication, but other embodiments may include more than two levels. Graded delegated authentication allows a user to authenticate to a relying party that itself is not fully trusted by the OTP management service. It should be noted, however, that the present invention does not require the use of graded delegated authentication, and may be implemented using only a single level of trust for which a relying party satisfying that level of trust is provided with delegated authentication information. Again, such delegated authentication information may comprise, for example, one or more OTPs or one or more values derived from the one or more OTPs.

As noted above, the term "level of trust" as used herein is intended to be broadly construed, so as to encompass a variety of different characterizations of the trustworthiness of a relying party. Accordingly, the present invention is not limited to the particular level of trust arrangements described in conjunction with the illustrative embodiments.

The one or more values derived from the one or more OTPs are derived in such a way that the relying party would need to spend considerable computational resources to find the OTP (s) input to the derivation process, yet can still employ the values to authenticate the OTP(s) provided by the user.

Values derived from OTPs are also referred to herein as protected OTPs or POTPs. These values are referred to as "protected" because the OTPs underlying the values cannot easily be derived by anyone in possession of the values, and hence the OTPs themselves are protected against misuse such as user impersonations.

It is also possible that the delegated authentication information may comprise values derived from POTPs. Such doubly-protected values are also referred to herein as protected POTPs, or PPOTPs. The particular derivative values sent by the OTP management service to the relying party in conjunction with the T3 operation may comprise POTPs or PPOTPs, again possibly depending on the determined level of trust of the relying party. Thus, a less trustworthy relying party may receive PPOTPs rather than POTPs. Use of OTPs, POTPs and PPOTPs supports graded delegation with three distinct levels of trust.

At time T4, the relying party 106 authenticates the user based on the delegated authentication information received from the OTP management service 110. It should be noted that if the delegated authentication information includes a value derived from an OTP, the relying party may need to derive a value from an OTP provided by the user via application 104 in order to perform the authentication.

At time T5, if the user has been authenticated, the user is granted access by the relying party 106 to the protected resource 300.

These particular process operations are presented by way of illustrative example only, and other embodiments may include different operations.

As one example, in an alternative embodiment it is possible that a relying party may want to utilize the delegated authentication information to establish a key to be shared with a user, either with or without explicitly authenticating the user based on the delegated authentication information. Typically, subsequent correct use of the key would implicitly authenticate the user. These and other alternative embodiments are considered part of the present invention.

An advantage of single-level or graded delegated authentication of the type described in conjunction with FIG. 3 is that it allows relying parties to utilize the OTP management service 110 or other central authentication service to obtain delegated authentication information that may be used to authenticate users even though the relying party does not have possession of the corresponding OTPs. This is accomplished without requiring that the central authentication service be made aware of the particular details used to generate OTP-derivative information held by the relying party. Thus, an otherwise conventional central authentication service can be configured to support a wide variety of application protocols, without requiring that the service be made aware of the particular details of those protocols.

It was noted above that the particular configuration of system elements shown in FIG. 1 is exemplary only, and that numerous other system configurations may be used in implementing the invention. FIG. 4 shows one such alternative system 400, in which the user device comprises an authentication token 402 that interacts with an application 404. In this system, the application 404 is the relying party, and interacts with the OTP management service 110 in a manner similar to that previously described.

Additional aspects of delegated authentication processes in accordance with the invention will now be described.

In the FIG. 3 embodiment, the client application 104 presented the relying party 106 with the OTP provided by the user. In other embodiments, the user OTP need not be provided to the relying party. For example, the client application may instead provide evidence of user knowledge of the current OTP. This may be achieved by deriving a key from the OTP and using the key to provide a message authentication code (MAC) on a message known by the relying party to be "fresh" (i.e., not replayed). This message could be a challenge issued by the relying party or the agent.

The relying party 106 may provide feedback to the OTP management service 110 regarding the success or failure of the user authentication. For example, once the user is authenticated, the relying party may inform the OTP management service and indicate the OTP management service-provided value used in the process.

It is generally desirable for relying parties to authenticate to the OTP management service or to a third party trusted by the OTP management service. This authentication would typically be independent of the authentication of the user to the relying party. It could, for example, be based on pre-shared keys or a PKI.

A request from the relying party 106 for delegated authentication information need not take any particular form, and this request, as referred to herein, is intended to be broadly construed. By way of example, the request may be a Get OTP request, whereby the relying party requests one or more OTPs. Other examples of the request include a Get POTP request and a Get PPOTP request, which involve requests for one or more POTPs or PPOTPs, respectively. These request types are also used herein to denote interfaces between the relying party and the OTP management service. Other types of interfaces include Validate OTP and Validate POTP interfaces. These are interfaces where a relying party simply requests validation of an OTP or POTP.

When a Get POTP request is received, the OTP management service 110 provides a POTP that may be generated by applying a one-way function to input data such as information derived from a relying party identity or identifier and the current OTP. This mitigates the possibility of a corrupt relying party using the OTP management service response to impersonate a user (either by recovering the OTP or by passing the POTP to another relying party, hence the inclusion of the identity or identifier). For time-based OTP algorithms, the one-way function used to generate the POTP should preferably be applied in a manner that makes it infeasible (i.e., computationally unattractive) for relying parties to find the underlying OTP within its lifetime.

To defend against pre-computation attacks, a "salt" value or nonce may also be included in the input to the one-way function, as is conventional in schemes such as PKCS #5. See RSA Laboratories, "PKCS #5: Password-based Cryptography Standard," Version 2.0, March 1999, which is incorporated by reference herein. The additional value may need to be provided to the client application 104 to be combined there with the OTP value. For additional security, a PIN or static password presented by the user may also be included in the input to the derivation process.

When a Get PPOTP request is received, the OTP management service 110 provides a PPOTP that may be generated by applying a one-way function to a POTP. This type of interface may be used, for example, when POTPs are provided by the client application 104 to the relying party 106 for user authentication (e.g., to minimize the risk of man-in-the-middle attacks) but the OTP management service does not trust the relying party with a POTP value (because it may be used to impersonate a user to the same relying party, should the relying party's security be temporarily compromised). When a relying party receives a PPOTP from the OTP management service and has an OTP or POTP from a client application it will apply the one-way function to the client application provided OTP (in two levels) or POTP (in one level) and compare the result with the value received from the OTP management service.

Derivation of POTPs and PPOTPs may also or alternatively make use of techniques disclosed in the above-cited RFC 4793 reference. In this reference, a process for derivation of POTP (PPOTP) values is described, involving—besides the OTP itself—a "salt" value, an iteration count, an optional "pepper" value, and an identifier for a requesting party. The result is viewed as a cryptographic key or a concatenation of several cryptographic keys. In other applications, the result may be viewed simply as an authentication credential. In yet further applications, additional parameters may be needed, e.g., transaction data in the case of authentication of a transaction.

TABLE 1 below shows which of a number of various use cases of the authentication system 100 can be supported by Validate OTP, Validate POTP, Get OTP, Get POTP and Get PPOTP interfaces between the relying party 106 and the OTP management service 110:

TABLE 1

OTP Use Cases vs. Interfaces

| Use Case | Relying Party Interface to OTP Management Service (as exposed by Agent) | | | | |
|---|---|---|---|---|---|
| | Validate OTP | Validate POTP | Get OTP | Get POTP | Get PPOTP |
| User authentication based on OTP provided by client application | ✓ | ✓ | ✓ | ✓ | ✓ |
| User authentication based on POTP provided by client application | x | ✓ | ✓ | ✓ | ✓ |
| Key establishment based on OTP | x | x | ✓ | x | x |
| Key establishment based on POTP | x | x | ✓ | ✓ | x |

Note:
A "✓" indicates that the use case can be met with the given interface, while a "x" indicates that it cannot.

As indicated previously, use of OTPs, POTPs and PPOTPs can support delegated authentication with three levels of trust.

Relying parties with the lowest level of trust would typically have access only to the Get PPOTP interface (or the Validate POTP interface), only enabling them to authenticate a user based on a provided OTP or POTP.

At the next level, a relying party would have access to the Get POTP interface and be able to, in addition to authenticating a user, participate in a key establishment based on a POTP.

At the most trusted level, a relying party would also be able to participate in key establishment based on OTPs.

Other trust levels are certainly possible. For instance, each of the five interfaces identified in TABLE 1 could correspond to a different trust level, and the range of inputs to the derivation process (identifiers, salt values, pepper values, iteration counts, etc.) could also be constrained based on the level of trust.

To avoid potential compromise of sensitive data, only the information necessary for a relying party to complete an authentication or key establishment operation should be provided to the relying party by the OTP management service. For instance, if a relying party only needs to validate an OTP value, then the service generally should provide only a one-way function of the OTP value, not the OTP itself. Otherwise, if the relying party is compromised, it may be possible for an adversary to impersonate the user by presenting the OTP value obtained to another party in the system. On the other hand, if a relying party needs to derive a key from an OTP value, then the OTP management service generally will need to provide the full OTP value to the relying party. The service may therefore need higher security assurances about the latter relying party than the former, e.g., that it is behind an enterprise's firewall. Moreover, the degree of trust the service is willing to place in a relying party may vary for instance as a function of time of day, or of the user. Consequently, although the OTP management service may implement multiple services that enable it to delegate capabilities to a relying party, access to those services will typically be graded based on the identity of the relying party and other factors. These concerns also apply to the agent in embodiments such as that shown in FIG. 3 in which the relying party communicates with the OTP management service via an agent.

The above-noted interfaces could be useful in a wide variety of other OTP applications. For instance, in a disconnected authentication scenario such as that described in U.S. Patent Application Publication No. 2005/0166263, a disconnected authentication agent could use the Get POTP interface to retrieve information allowing subsequent off-line user authentication. In such an arrangement, it may be beneficial for relying parties to be able to indicate the size of the set of acceptable OTP values. As another example, a provisioning server for the "Tune-Codes" mechanism described in U.S. Patent Application Publication No. 2007/0113294 could obtain its OTPs via the Get OTP request. Also, various techniques that involve validation of "historical" OTPs could be accommodated by a Get OTP request (less-trusted relying parties may be needed for this purpose than to get future OTPs, as long as the record of transactions involving past OTPs is integrity-protected), assuming the relying party is able to indicate the time (or event, challenge, or combination thereof) for which an OTP (POTP, PPOTP) is desired. One example use case is where a relying party needs to verify an authentication made at a certain point in time.

As other examples, relying parties that only validate OTPs could use the Get POTP request, and those that only validate POTPs could use the Get PPOTP request.

As mentioned previously, feedback could be provided by the relying party back to the OTP management service. For example, a relying party may report a "used" OTP back to the OTP management service. This may be accomplished using an Inform OTP/POTP message, where a relying party could inform the OTP management service about the outcome of a delegated validation (and the corresponding OTP, POTP, or PPOTP in the case of success). Such feedback would allow for the recording of the latest known OTP state—what is also referred to herein as a "high watermark"—associated with a time- or event-based OTP token. The recording of such high watermarks enables protection against replay attacks. Additionally, the OTP management service would be able to maintain a high watermark for each of its relying parties and/or response types (OTP, POTP, and PPOTP). This could be useful, e.g., when the OTP management service has different levels of trust in the relying parties. Yet another alternative could be for the OTP management service to delegate also the maintenance of high watermarks to relying parties. This assumes, however, that information related to each OTP, PTOP or PPOTP, such as the corresponding time or event, is provided to the relying party together with the OTP(s), POTP (s) or PPOTP(s).

Mandated feedback to the OTP management service may also be used to allow re-synchronization. For example, the OTP management service could, when detecting that a "matching" OTP was outside some inner threshold of acceptable OTPs but inside a larger threshold of OTPs acceptable with further evidence (e.g., ability to demonstrate knowledge of also the "next" (in the sense of next OTP state)), provide a return code to the relying party indicating the need for a second authentication phase based on the "next" OTP. The second response would then only contain OTP(s), POTP(s), or PPOTP(s) satisfying the "next" condition (more than one value may satisfy this condition).

The relationship between the identity of a relying party (as seen by the client application) and the authentication of the relying party (or agent) to the OTP management service may need to be addressed. For example, in certain scenarios, the OTP management service may need to know the mapping between the two identities in order to construct a valid POTP or PPOTP. The agent could then provide the identity of the relying party to the OTP management service (assuming it is trusted to do so or that the information authenticates the relying party). As an example, the interface between the agent and the relying party could allow for this information to be passed, or the passed credential could itself contain it. In other scenarios, the mapping may be 1:1, i.e. the identity as seen by the client application should be the same as the identity seen by the OTP management service. This could, for example, be the case when the agent resides on the same host as the relying party and the identifier is based on some common value such as the host's IP address or domain name. One advantage of the latter is that an OTP management service need not maintain a mapping between agents and relying parties and furthermore there is no need to transfer this information to the OTP management service. On the other hand, the scheme is less flexible as it does not allow for certain configurations, e.g., a single agent on a multi-hosted server. As indicated previously, other embodiments may eliminate the agent altogether, although there is generally still a need to reconcile the identity of the relying party as seen by the client application or user and the identity of the relying part as seen by the OTP management service.

The OTP management service may determine the degree to which it trusts the relying party using a per-party configured value in the OTP management service. As an alternative, the relying party could conceivably demonstrate its trust level, e.g., by assertions about its posture or configuration (and that of the host(s) it is running on). As another example, the trust level of a given relying party could be determined as a function of the dynamics of the context it operates in (e.g., trust is higher during certain times of the day or when serving certain relying parties). Again, these and other trust or security issues herein also apply to agents in embodiments that include such entities.

Similarly, the POTP parameters described above could vary depending on the relying party or the degree of trust associated with the relying party. For example, for a relying party for which the OTP management service has a lower degree of trust but still allows POTP distribution, the pepper value and iteration count described in the above-cited RFC 4793 reference could be set higher. This, however, implies an ability to align these parameters with the corresponding values of the client application.

Authentication of the relying party to the client application (i.e., mutual authentication) may also be an issue. In the above-cited RFC 4793 reference, for example, a relying party needs to compute a response based on a POTP value in order to authenticate itself to the client application. If the return value is based on the same POTP value that was used as a basis for the user authentication, then a Get POTP request may be sufficient, as all required values (both for authenticating the user and computing a response) can be derived from it. But it could also be that calculation of the relying party's POTP value requires knowledge of the OTP, in which case a Get OTP request is required. In another scenario, calculation of the relying party's authentication credential may require knowledge of some future OTP value in which case not even a Get OTP request would be sufficient. The interfaces described above could therefore be augmented to support mutual authentication as described.

The delegated authentication techniques described above do not rely on any specific OTP technology. Thus, it does not matter if the OTP underlying a POTP or PPOTP value was calculated by a time-based, an event-based, or a challenge-response OTP algorithm, or a hybrid based on various combinations of such algorithms. However, differences in the underlying OTP technology may of course be reflected in an actual implementation. As an example, a challenge-response OTP algorithm does not require re-synchronization.

Furthermore, when dealing with a challenge-response based OTP algorithm, a challenge could be supplied by the relying party to the client application—enabling some form of transaction signing. The challenge could, in some scenarios—and in particular when a combined time- and challenge-response OTP algorithm or a combined event- and challenge-response OTP algorithm is used—conceivably also be generated by the client application itself.

The delegated authentication techniques disclosed herein may be subject to standardization. For example, delegated authentication could be specified in an open manner by extending existing standards such as OTPS-VS. This would allow the independent development of protocol-specific, OTP-using relying parties without the need for any modification of the OTP management service. Such relying parties would also be "future proof," that is, protected against changes in the OTP management service interface. Similarly, the format of POTPs and PPOTPs could benefit from standardization, enabling broader and interoperable use of these values by relying parties.

Many alternative embodiments of the invention will be apparent. For example, in one such alternative embodiment, an OTP management service could be configured to derive relying party-specific OTP seeds and provide these seeds to each relying party. In this setting, relying parties may issue a Get Derived Seed request once for each user (and lifetime of the seed) to the OTP management service, possibly using techniques similar to those described in U.S. Pat. No. 6,985, 583. One difference compared to the delegated authentication process of FIG. 3 is that in this alternative, the relying parties would need to maintain long-term secrets. Another difference is that with the alternative scheme, a relying party who is provided or otherwise determines an OTP (e.g., through reversing the one-way function) would not be able to impersonate a user through another relying party. Combinations of the two schemes are also possible, e.g., Get OTP requests could provide OTPs where the OTP has been computed based also on the identity of the relying party.

A related alternative is for the OTP management service to implement a generic Get Derived Seed interface that is not specific to any particular relying party. This could be used in conjunction with schemes that require a stronger base secret than an OTP but where security prohibits relying parties from knowing the master seed. Of course, the scheme assumes that user tokens will "know" (or have the ability to generate) these derived secrets. One example of this is in the common case of HTTP Digest Authentication, described in R. Fielding et al., "Hypertext Transfer Protocol—HTTP/1.1," IETF RFC 2616, June 1999, where a Digest Authentication scheme based on OTPs would be too weak but where one could use a strong secret derived from the OTP seed as the shared secret instead. With such an interface, HTTP authentication support could easily be implemented with separate HTTP—knowledgeable agents (and would more generally indicate the desired path forward of protocol—aware agents interacting with a generic OTP management service).

It was noted above that certain client applications implement protocols in which the application receives an OTP from a user and sends information derived from the OTP to a relying party, rather than sending the OTP itself to the relying party. The delegated authentication techniques as described herein advantageously allow an OTP management service to be configured without knowledge of these particular protocols. Two examples will now be described with reference to the EAP-POTP protocol described in the above-cited RFC 4793 reference and to the OTP Kerberos protocol described in G. Richards, "OTP Kerberos," IETF Work in Progress, October 2006. In these examples, the authentication systems comprise client application 104, relying party 106 and OTP management service 110.

Figure 5:
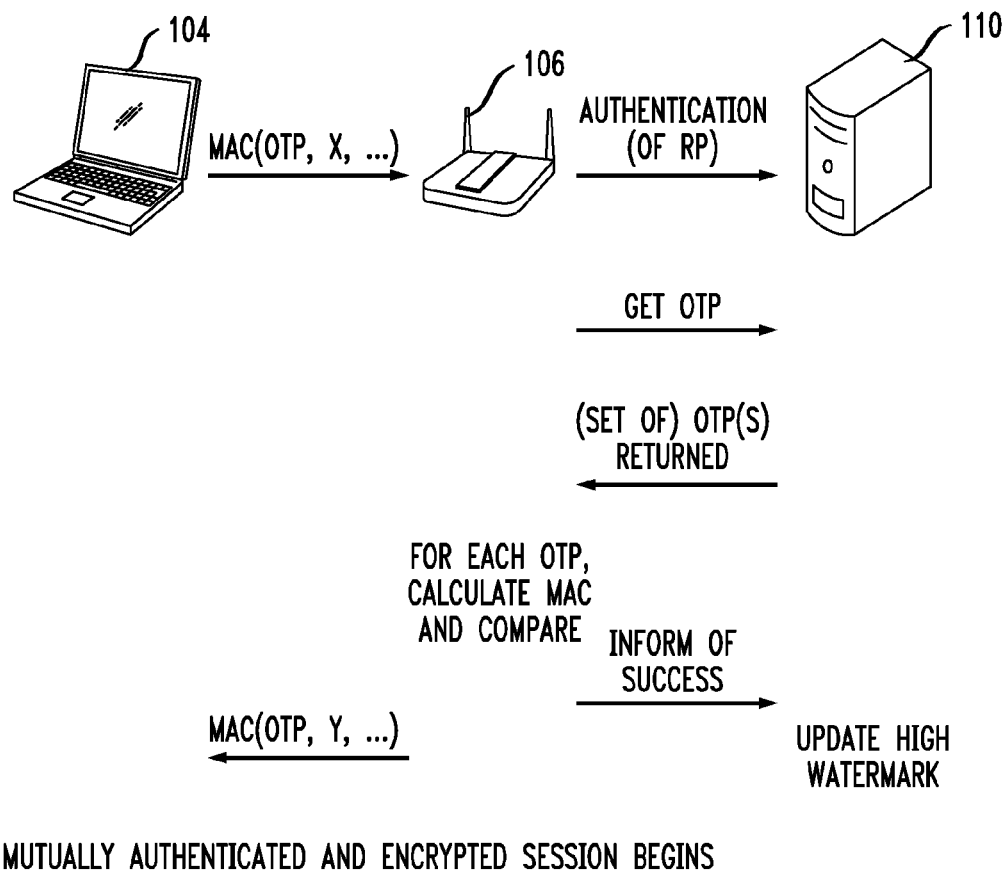
FIGS. 5 and 6 show examples of particular implementations of delegated authentication in the context of respective EAP-POTP and OTP Kerberos application protocols.

Referring now to FIG. 5, client application 104 illustratively runs on a portable computer and interacts with relying party 106 which may be in the form of a wireless access point. The client application receives a current OTP from a user and generates a MAC on the received OTP and additional information X such as a salt value and an identifier of the relying party as seen by the client application. The resulting MAC is sent to the relying party. To validate this MAC, the relying party 106 first authenticates itself to the OTP management service to demonstrate its authorization to issue Get OTP requests. The relying party then issues a Get OTP request to the OTP management service identifying the user and/or the user's OTP token. This request could conceivably return several valid OTPs. For each returned OTP, the relying party calculates a MAC and compares that MAC with the MAC received from the client application. If a match is found, the relying party informs the OTP management service of success, which allows for high watermark maintenance. The relying party then calculates a new MAC on the OTP and additional information Y in accordance with the EAP-POTP protocol, using the same MAC key, and provides this MAC to the client application for mutual authentication. A mutually authenticated and encrypted session between the client application and the relying party then begins.

It can be seen that the OTP management service 110 in this example need not have any knowledge of the EAP-POTP protocol carried out between the client application 104 and the relying party 106.

Figure 6:
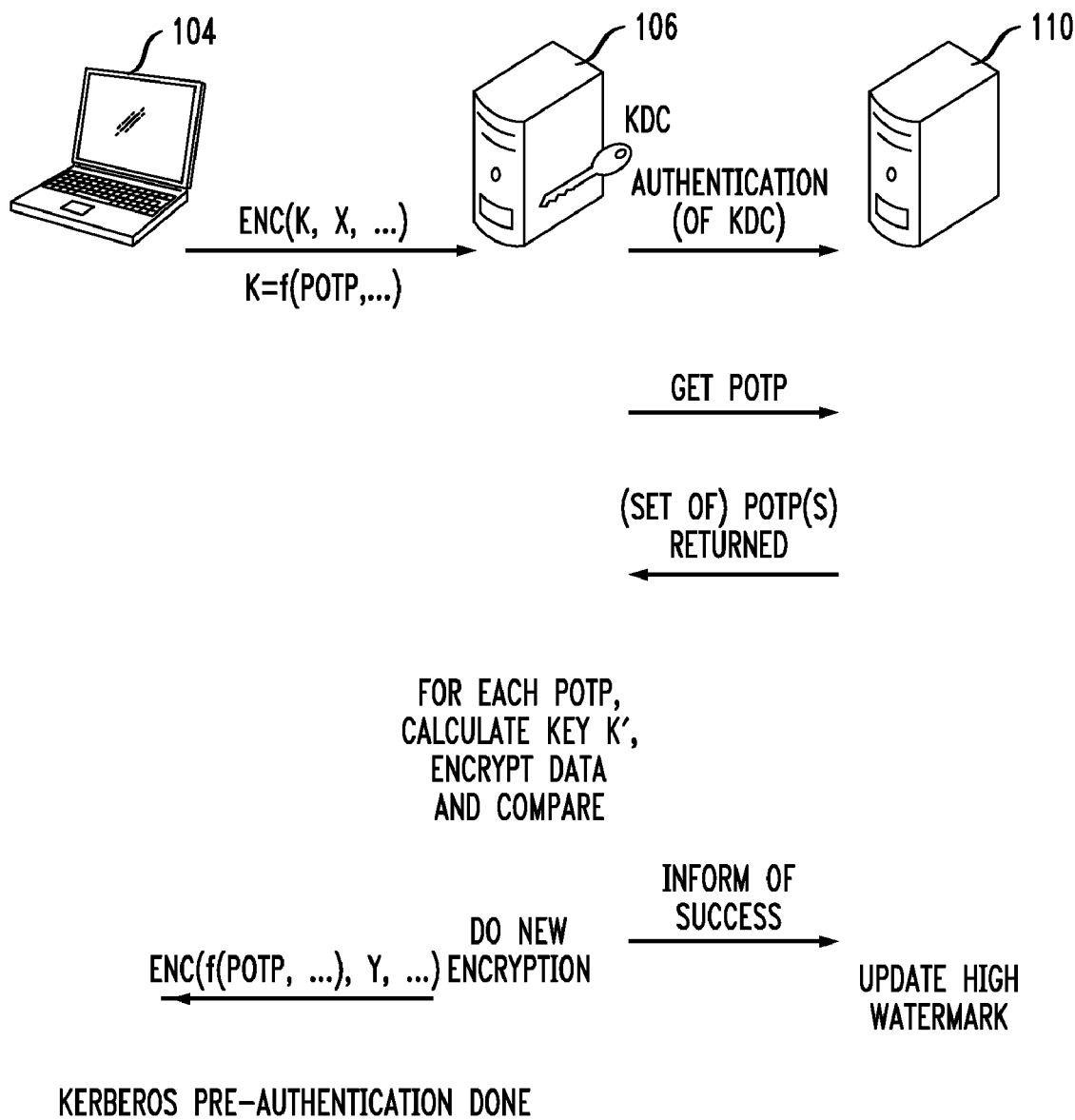

FIG. 6 shows a similar example with reference to the OTP Kerberos protocol. In this example, client application 104 is again running on a portable computer, but the relying party 106 is a server implementing a key distribution center (KDC) entity. The client application receives a current OTP from a user and calculates a POTP. A key K is generated by applying the POTP and possibly other information to a function $f$. The key K is then used to encrypt information X and the result of the encryption is supplied to the relying party. To validate the corresponding POTP, the relying party first authenticates itself to the OTP management service to demonstrate its authorization to issue Get POTP requests. The relying party then issues a Get POTP request to the OTP management service identifying the user and/or the user's OTP token. This request could conceivably return several valid POTPs. For each returned POTP, the relying party calculates a key K', encrypts information X using the key K', and compares the encrypted value with the value received from the client application. If a match is found, the relying party informs the OTP management service of success, which allows for high watermark maintenance. To achieve mutual authentication, the relying party then encrypts information Y using the key calculated from the corresponding POTP value and provides this new encryption value to the client application. If the client application can validate the response from the relying party, the Kerberos pre-authentication has ended successfully.

Again, it can be seen that the OTP management service 110 in this second example need not have any knowledge of the OTP Kerberos protocol carried out between the client application 104 and the relying party 106.

The foregoing examples thus illustrate the manner in which the OTP management service 110 can support authentication by a relying party based on OTP-derivative information without requiring the OTP management service to have knowledge of the particular protocol(s) used to generate that OTP-derivative information.

It should again be emphasized that the particular delegated authentication techniques described above are provided by way of illustration, and should not be construed as limiting the present invention to any specific embodiment or group of embodiments. For example, as previously noted, the described embodiments may be adapted in a straightforward manner to operate with other types of credentials or authentication information, rather than just passwords, and the techniques can be adapted in a straightforward manner to a wide variety of other types of protected resources including resources that are either local to or remote from the user device. Also, the particular configuration of system elements shown in FIGS. 1, 2 and 4, and their interactions as shown in FIGS. 3, 5 and 6, may be varied in other embodiments. Moreover, the various simplifying assumptions made above in the course of describing the illustrative embodiments should also be viewed as exemplary rather than as requirements or limitations of the invention. These and numerous other alternative embodiments within the scope of the appended claims will be readily apparent to those skilled in the art.

What is claimed is:

1. A user authentication method comprising the steps of:
   receiving a request from a relying party for delegated authentication information associated with a particular user, the delegated authentication information having the property that the user can be presently authenticated based on such information;
   determining a level of trust associated with the relying party; and
   providing the delegated authentication information to the relying party responsive to the request only if the relying party has a sufficient level of trust, so as to permit the relying party to authenticate the user based on the delegated authentication information;
   wherein each of the steps is performed at least in part by one or more processing devices; and
   wherein the step of determining a level of trust associated with the relying party further comprises determining which of a plurality of trust levels is associated with the relying party, the plurality of trust levels corresponding to respective ones of a plurality of different types of delegated authentication information, and the step of providing the delegated authentication information to the relying party further comprises providing delegated authentication information of a particular one of the plurality of different types to the relying party based on the particular one of the plurality of trust levels determined to be associated with the relying party.

2. The method of claim 1 wherein the delegated authentication information comprises at least one value derived from an authentication credential of the particular user.

3. The method of claim 2 wherein the at least one value comprises a protected one-time password derived from a one-time password of the particular user.

4. The method of claim 2 wherein the at least one value comprises a doubly protected one-time password derived from a protected one-time password of the particular user.

5. The method of claim 2 wherein the authentication credential comprises at least a portion of at least one password.

6. The method of claim 5 wherein the password comprises a one-time password.

7. A user authentication method comprising the steps of:
receiving a request from a relying party for delegated authentication information associated with a particular user, the delegated authentication information having the property that the user can be presently authenticated based on such information;
determining a level of trust associated with the relying party; and
providing the delegated authentication information to the relying party responsive to the request only if the relying party has a sufficient level of trust, so as to permit the relying party to authenticate the user based on the delegated authentication information;
wherein each of the steps is performed at least in part by one or more processing devices; and
wherein the relying party is not in possession of an authentication credential of the user but is in possession of information derived from the authentication credential of the user.

8. The method of claim 7 wherein the delegated authentication information permits the relying party to authenticate the information derived from the authentication credential of the user.

9. The method of claim 8 wherein the information derived from the authentication credential of the user comprises a message authentication code generated based on at least the authentication credential.

10. The method of claim 8 wherein the information derived from the authentication credential of the user comprises an encryption performed utilizing at least a function of the authentication credential.

11. The method of claim 1 wherein the delegated authentication information comprises one or more seeds utilized to generate an authentication credential of the user.

12. The method of claim 1 further comprising the step of receiving feedback information from the relying party indicative of status of the authentication of the user.

13. A non-transitory machine-readable storage medium having encoded therein executable instructions, wherein the executable instructions when executed by the one or more processing devices implement the steps of the user authentication method of claim 1.

14. The method of claim 1 wherein the level of trust associated with the relying party is determined at least in part by a time-related parameter of the request for delegated authentication information received from the relying party.

15. The method of claim 1 wherein the level of trust associated with the relying party is determined at least in part by an identity of the particular user.

16. A user authentication method comprising the steps of:
receiving a request from a relying party for delegated authentication information associated with a particular user, the delegated authentication information having the property that the user can be presently authenticated based on such information;
determining a level of trust associated with the relying party;
providing the delegated authentication information to the relying party responsive to the request only if the relying party has a sufficient level of trust, so as to permit the relying party to authenticate the user based on the delegated authentication information;
receiving feedback information from the relying party indicative of status of the authentication of the user; and
updating high watermark information based on the feedback information;
wherein each of the steps is performed at least in part by one or more processing devices.

17. An apparatus comprising:
at least one processing device comprising a processor coupled to a memory, said processing device implementing an authentication-delegating service which is configured to receive a request from a relying party for delegated authentication information associated with a particular user, the delegated authentication information having the property that the user can be presently authenticated based on such information; to determine a level of trust associated with the relying party; and to provide the delegated authentication information to the relying party responsive to the request only if the relying party has a sufficient level of trust, so as to permit the relying party to authenticate the user based on the delegated authentication information;
wherein the authentication-delegating service comprises a graded authentication-delegating service configured to determine which of a plurality of trust levels is associated with the relying party, the plurality of trust levels corresponding to respective ones of a plurality of different types of delegated authentication information, and to provide delegated authentication information of a particular one of the plurality of different types to the relying party based on the particular one of the plurality of trust levels determined to be associated with the relying party.

18. The apparatus of claim 17 wherein said processing device comprises an authentication server.

19. A method comprising the steps of:
sending a request from a relying party to an authentication-delegating service for delegated authentication information associated with a particular user;
receiving the delegated authentication information from the authentication-delegating service responsive to the request only if the relying party is determined by that service to have a sufficient level of trust associated therewith; and
utilizing the delegated authentication information to establish a key to be shared between the relying party and the user;
wherein the steps are performed at least in part by one or more processing devices; and
wherein the authentication-delegating service determines which of a plurality of trust levels is associated with the relying party, the plurality of trust levels corresponding to respective ones of a plurality of different types of delegated authentication information, and the step of receiving the delegated authentication information from the authentication-delegating service further comprises receiving delegated authentication information of a particular one of the plurality of different types from the authentication-delegating service based on the particular one of the plurality of trust levels determined to be associated with the relying party.

20. The method of claim 19 wherein the user is implicitly authenticated by the relying party based on subsequent correct use of the shared key by the user.

21. A system for authenticating a user, comprising:
a plurality of processing devices;
a first one of the processing devices implementing a relying party and configured for communication with a second one of the processing devices implementing an authentication-delegating service;
wherein the authentication-delegating service is configured to receive a request from a relying party for delegated authentication information associated with a particular user, the delegated authentication information having the property that the user can be presently authenticated based on such information; to determine a level of trust associated with the relying party; and to provide the delegated authentication information to the relying party responsive to the request only if the relying party has a sufficient level of trust, so as to permit the relying party to authenticate the user based on the delegated authentication information; and
wherein the authentication-delegating service comprises a graded authentication-delegating service configured to determine which of a plurality of trust levels is associated with the relying party, the plurality of trust levels corresponding to respective ones of a plurality of different types of delegated authentication information, and to provide delegated authentication information of a particular one of the plurality of different types to the relying party based on the particular one of the plurality of trust levels determined to be associated with the relying party.

22. An apparatus comprising:
at least one processing device comprising a processor coupled to a memory, said processing device implementing a relying party configured to send a request to an authentication-delegating service for delegated authentication information associated with a particular user, the delegated authentication information having the property that the user can be presently authenticated based on such information; to receive the delegated authentication information from the authentication-delegating service responsive to the request only if the relying party is determined by that service to have a sufficient level of trust associated therewith; and to authenticate the user based on the delegated authentication information;
wherein the authentication-delegating service determines which of a plurality of trust levels is associated with the relying party, the plurality of trust levels corresponding to respective ones of a plurality of different types of delegated authentication information, and the received delegated authentication information from the authentication-delegating service further comprises delegated authentication information of a particular one of the plurality of different types based on the particular one of the plurality of trust levels determined to be associated with the relying party.

* * * * *